United States Patent [19]
Armstrong

[11] 3,813,015
[45] May 28, 1974

[54] FLOW CONTROL VALVE AND CONTROL SYSTEM THEREFOR

[76] Inventor: George W. Armstrong, P.O. Box 507, Fairborn, Ohio 45324

[22] Filed: Mar. 9, 1973

[21] Appl. No.: 339,521

[52] U.S. Cl............................... 222/445, 222/504
[51] Int. Cl............................................. G01f 11/28
[58] Field of Search .......... 222/445, 450, 448, 449, 222/504

[56] References Cited
UNITED STATES PATENTS

| | | | |
|---|---|---|---|
| 3,410,422 | 11/1968 | Carpentier | 222/445 X |
| 3,556,358 | 1/1971 | Armstrong | 222/445 |
| 3,650,436 | 3/1972 | Barber | 222/445 X |

*Primary Examiner*—Robert B. Reeves
*Assistant Examiner*—Joseph J. Rollo
*Attorney, Agent, or Firm*—Biebel, French & Bugg

[57] ABSTRACT

An air lock or metering flow control valve for flowable bulk material has a symmetric arrangement of blades and piston motors, and includes a curved upper flow control blade and an independent curved lower flow control blade. Separate symmetrically-arranged pairs of piston motors control the movement of each valve blade.

A fluid pressure control circuit is disclosed for operating a pair of movable blades in a conduit by which the upper blade is opened and closed followed by the opening and closing of the lower blade to provide for the controlled flow of a metered amount of material. The control system is responsive to the movement or lack of movement of the blade piston motors rather than to actual positions of the motors, so that the flow control valve cannot be jammed by the stopping of one or the other of the valve blades.

The valve control system includes a pair of flow reversing inlet valves, one for each of the pairs of piston motors operating each blade, to cause the opening and closing movement of the blade. An inlet control valve circuit includes a pair of normally open control valves which are connected to control the inlet valves and which have control end caps connected to respond to an air pressure representing the movement of the other pistons, to prevent shifting of its associated inlet valve as long as the other pistons are either extending or retracting. A four-way valve has its outlet ports connected to the control valves and has its control end caps connected through normally open three-way valves. The three-way valves respond to either of the pairs of piston motors reaching the end of its opening stroke to effect reversal of the application of fluid pressure to the control valves.

7 Claims, 4 Drawing Figures

FLOW CONTROL VALVE AND CONTROL SYSTEM THEREFOR

BACKGROUND OF THE INVENTION

In my prior U.S. Pat. No. 3,380,475, I disclose and claim blade type valves for controlling the flow of bulk or dry materials. The curved blades of these valves are controlled by linear actuators, preferably piston-type motors, to move the blades between flow-permitting and flow-blocking positions in a valve body or a conduit. In my prior U.S. Pat. No. 3,556,358, I have disclosed and claimed an air lock and metering type gate valve in which a pair of valve blades are controlled by fluid pressure actuators. The blades are spaced apart in an elongated section of the valve housing to define therebetween a space or volume of predetermined dimension. The valve blades are operated in predetermined sequence so that material enters the body of the valve and is discharged therefrom, and a control system is disclosed which provides for the sequential operation of the valve blades.

In the preferred construction of the valves of my prior U.S. Pat. No. 3,556,358, common linear actuators were employed for operating the upper and lower blades. I have now found that it may be preferred in some instances to operate or control the blades independently of each other such as by independent actuators. Such an arrangement permits an air-lock valve to be made with a symmetrical arrangement of parts. It also permits an air lock or metering arrangement to be made by using a pair of independent valves arranged in tandem or series, of the type shown in my U.S. Pat. No. 3,380,475 or of the "low profile" type shown in my U.S. Pat. No. 3,589,670. The latter arrangement of two valves permits a metering system to be made up of any capacity depending on the volume of the conduit between the valve blades.

SUMMARY OF THE INVENTION

One of the important objects of the present invention is to provide a double-bladed valve in which return springs and blade-operated pilot valves are eliminated, and in which a symmetrical arrangement of piston motors or linear actuators is provided so that the same parts may be used for the upper or lower blade. This simplifies the problems of manufacturing the valve. Further advantages reside in the fact that substantially more power is available for the movement of each of the blades, and a lower line pressure may therefore be used.

A further advantage of the present invention resides in the provision of a novel valve blade control system, in which fluid pressure-operated valves are employed, including a logic circuit for controlling the movement of the valve blades in predetermined sequential relation. A sequence of signals are applied to the linear actuators which results in the opening and the closing of the upper blade followed by the opening and the closing of the lower blade. An interlocking valve control system utilizes a pressure signal developed by the exhausting of the air from the opposite side of the moving linear actuators of one blade to control the operation of the other blade.

More particularly, a pair of flow-reversing inlet valves are connected to control the linear actuators to apply fluid pressure alternately to the opposite ends of the associated pair of actuators to cause corresponding opening and closing movements of their associated blade. The control system is responsive, for example, to the opening and closing movement of the first blade for retaining the second blade in its closed position, thus permitting the filling of the space between the blades. The control system is further responsive to the corresponding opening and closing movement of the second blade to retain the first blade in its closed position. A controller is responsive to the return of either of the blades to its closed position to initiate the extending movement of the linear actuators associated with the other blade.

The control system of the present invention has a number of distinct advantages. First, the system may be applied to control the opening and closing movement of single blades of two valves paired in a common conduit, thus permitting the use of two valves made according to my U.S. Pat. Nos. 3,380,475 or 3,589,670. Second, the system is jam-proof in that if an obstruction prevents the closing of one or the other of the blades, the system will continue through a cycle of operation, resulting in the opening of that blade and permitting the obstruction to drop through.

The control system permits versatility in control. The valve may be whut down with both blades forced in the closed position after the space between the blades has been emptied of material. It also permits both blades to be opened simultaneously for purging the system. Remote control, which can be manual, air or electric, controls the starting and stopping of the valve blades. The system is then started by opening the top blade first. Pressure is maintained on the linear actuators during shutdown to prevent "jack rabbit" starts. The rate of operation of the blades may be controlled by adjusting the bleed orifices. Preferably, the control system is pneumatic, and the valves are controlled by pneumatic signals applied to the control caps thereof.

It is accordingly an object of the invention to provide an improved air-lock type valve for flowable bulk material and a fluid pressure control system therefor.

A further object of the invention is the provision of a flow control valve in which each of two blades is controlled by separate linear actuators, and in which the valve is formed with a balanced design resulting in interchangeability of the fabrication of the linear actuators, the blades, blade arms and seals.

A further object of the invention is the provision of a fluid pressure control system which includes valve elements responsive to the exhausting of the air from one pair of the linear actuators to control the operation of another pair of the linear actuators.

A still further object of the invention is the provision of an air lock valve and control system as outlined above which is essentially fool-proof, is non-jamming and is automatic in operation.

These and other objects and advantages of the invention will be apparent from the following description, the accompanying drawings and the appended claims.

DESCRIPTION OF PREFERRED EMBODIMENT

Figure 1:
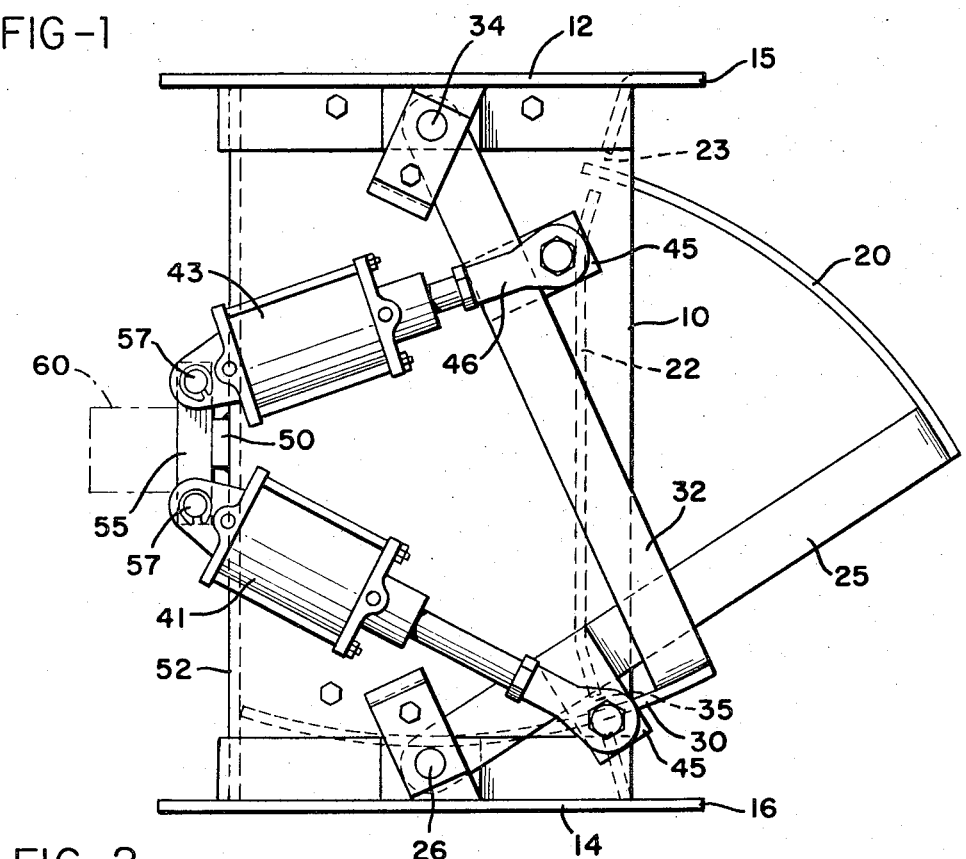
FIG. 1 is a side elevation of an air lock valve constructed according to this invention.
Figure 2:
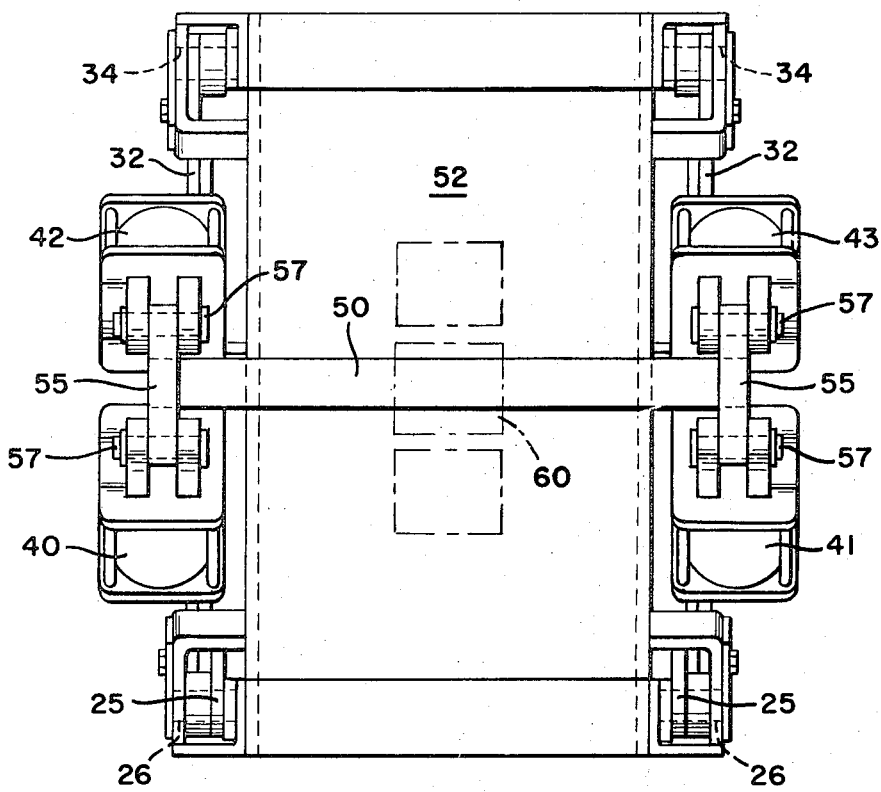
FIG. 2 is a front elevation of the valve of FIG. 1.

Referring to FIGS. 1 and 2, an improved metering or air-lock type valve according to the present invention is shown as having a generally rectangular, tubular body or housing 10 which extends between an inlet 12 and an outlet 14. The inlet 12 is defined by an encircling generally L-shaped rectangular valve mounting flange 15. A similar mounting flange 16 is provided at the housing outlet 14.

The improved valve includes first blade means defined by an upper curved blade 20 which is movable between flow-blocking and flow-permitting positions within the conduit 10. For this purpose, the rear wall 22 is formed with a blade slot 23 through which the blade 20 moves, supported on a pair of external blade supporting arms 25. The lower ends of the arms 25 are pivotally received on the flange 16 on pivot bearings 26. The blade 20 may be mounted and supported, insofar as the arms and pivot are concerned, in the manner described in connection with blade 30 of my U.S. Pat. No. 3,556,358. In addition, the seals at the slot 23 and at side and end walls of the valve housing 10 may be provided as shown in that patent, or as shown in my copending application Ser. No. 294,454, filed Oct. 2, 1972.

The improved valve further includes second blade means in the form of a lower curved blade 30 spaced from the blade 20 and also movable on support arms 32 between flow-blocking and flow-permitting positions within the conduit defined by the housing 10. For this purpose, the upper ends of the arms 32 are pivotally mounted on bearings 34, and again, the blade 30 and arms 32 may be mounted in the manner taught with respect to the blade 40 of my U.S. Pat. No. 3,556,358. Also, the second blade 30 moves through a suitable slot 35 formed in the wall 22, and again this slot, as well as the side walls and end walls, may be sealed as shown in my U.S. Pat. No. 3,556,358, or as shown in the above-identified copending application.

The valve of this application differs from that disclosed in U.S. Pat. No. 3,556,358 in that the blades 20 and 30 and the corresponding arms 25 and 32 are essentially identical and may be made from the same tooling. Further, pairs of identical fluid actuators are used for controlling the movement of the valves between the open and closed positions. For this purpose, preferably two-way pneumatic cylinder-type piston motors are used, there being a pair of piston motors 40 and 41 for controlling the movement of the upper blade 20 and a corresponding pair of piston motors 42 and 43 for controlling the movement of the lower blade 30.

Each of the arms 25 and 32 is formed with an extension 45 for receiving the rodeye 46 of the piston motor. The opposite body or cylinder end of the piston motor is pivotally attached to a cross brace 50 which is mounted on the front wall 52 of the housing. The opposite ends of the brace 50 are formed with a vertically-extending section 55 to pivotally receive the piston motors 40, 41, 42 and 43 on pins 57. Again, the arrangement of the upper and lower cylinders is symmetrical with respect to the vertical axis of the valve and with each other.

Before turning to the novel control system of this invention, certain advantages of the improved air lock valve as shown in FIGS. 1 and 2 may be appreciated. First, the blades and actuating cylinders are interchangeable, thus permitting savings in manufacture. Further, since the blades 20 and 30 are supported and move independently of each other, alignment of the blades within the body or housing with respect to the seals is simplified. Also, when the valve is in a standby condition or is not in use, the control circuit is manipulated in such a manner that both of the blades 20 and 30 are in their closed positions and in this position, the piston rods are retracted within their respective cylinders and are thus protected from exposure.

The forces on the valve housing are essentially balanced by the provision of the common connection at the support 55 and pins 57 for each of the adjacent pairs of piston motors. The control system as described in connection with FIG. 3 may be mounted on the transverse support 50 as indicated by the outline 60, and the pneumatic connections to the cylinders has been omitted in FIGS. 1 and 2 for the purpose of clarity.

Figure 3:
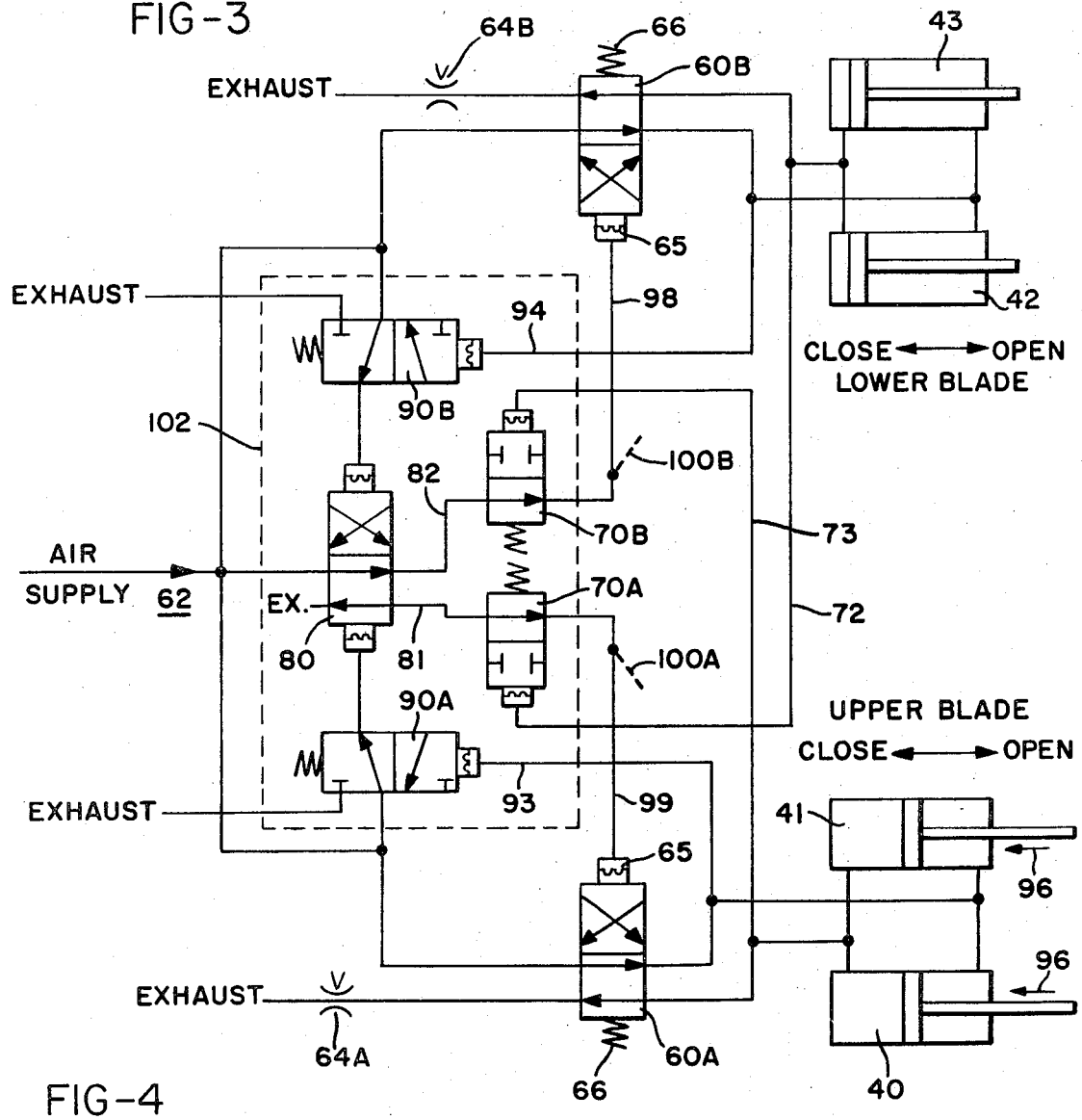
FIG. 3 is a pneumatic diagram of the control system.

The control system of the present invention is illustrated in FIG. 3 in which the valves are shown in their unenergized position. The lower piston motors 40 and 41 are shown as controlling the upper blade 20 while an upper pair of piston motors 42 and 43 are shown as controlling the lower blade 30. Further, for the purpose of illustration, the individual valves and the conduits therebetween are shown as being formed separately, but it is understood that two or more of these may be suitably grouped within a common valve block, as well known in the art. Also, in the preferred embodiment, air pressure is employed to operate the piston motors. This is a preferred arrangement in that sufficient power may readily be available from a source of air pressure as low as 30–50 psi. However, it is within the scope of the invention to provide other types of fluid pressure control systems including, specifically, hydraulic systems.

For each of the pairs of piston motors 40, 41 and 42, 43, there is provided a flow-reversing inlet valve designated as 60A and 60B. These valves are each connected to a source 62 of air under pressure to apply, in one position, the source to one side of the piston and in the other position to apply the source to the opposite side of the position, while alternately providing for the exhaust of the opposite piston side through needle valve bleed orifices 64A and 64B. It is understood that the needle valves 64 may be formed as an integral part of the valves 60. Further, while spring return valves 60 are shown, it is within the scope of the invention to employ double-piloted control valves.

The valves 60 are of the pilot valve controlled type in which a pilot cap 65 incorporates a pressure piston or diaphragm which is responsive to a signal applied thereto to shift the spool of the valve from its normal position, as shown and as maintained by the return spring 66 to the reversing position. The valves 60 should have a capacity sufficient to handle the requirements of the respective piston motors. The needle valves 64 are adjusted to control the rate at which air is permitted to escape from the opposite side of the piston and accordingly to control the rate which the valve blades move in operation.

Control valve means for controlling the operation of the inlet valves 60, in controlled cycles of operation, include a pair of normally-open, spring-return, two-way valves 70A and 70B. The valves 70 are each connected to control the application of air pressure to one of the pilot caps 65. The valve 70A has its outlet connected to the cap of valve 60A while the valve 70B has its outlet connected to the cap of valve 60B. The valves 70 are shown as being spring biased to a normally open position, and in turn are provided with pilot caps by means of which the valves may be biased to a closed or flow-blocking position.

The pilot cap of valve 70A is connected by a line 72 to the back side of the piston motors 42 and 43 while the pilot cap of valve 70B is connected by a line 73 to the back side of the piston motors 40 and 41. Thus, it may be observed that any time air pressure is applied either to line 72 or line 73, the respective control valve will be biased to its closed position. This occurs in either of two conditions: (a) when the associated piston motors are extending to the right as shown in FIG. 3 by reason of line pressure from supply 62 being applied to the piston motors; and (b) whenever the associated pistons are returning to their blade closed positions by reason of the application of line pressure to the rod ends of the piston motors. During condition (b), pressure is maintained in either line 72 or line 73, as the case may be, by reason of back pressure or restriction provided by the associated needle valve 64A or 64B.

At any one time, air under pressure from the source 62 is being applied to one of the valves 60 while the other is connected to exhaust by reason of a fluid pressure operated four-way control valve 80 having its outlet ports on lines 81 and 82 respectively connected to the inlet of valves 70A and 70B. When the spool of valve 80 is shifted, this condition is reversed, i.e., valve 70B is connected to exhaust and valve 70A to pressure. Valve 80 incorporates pilot caps at either end and is thus fully controlled between either of its two positions.

The control circuit includes a pair of further control valves 90A and 90B which are connected to apply pressure from the source 62 to one or the other control caps of valve 80. The valves 90 are of the normally open three-way spring biased type. The pilot caps of valves 90A and 90B are respectively connected to the rod side of piston motors 40, 41 and 42, 43. Accordingly, whenever the associated piston motors are being extended under the influence of line pressure to the back sides and whenever they are being returned by reason of line pressure being applied to the rod sides, a control signal is applied through line 93 or 94 to the respective valve 90A or 90B to hold that valve in its blocked position. In normal operation, the valves 90 respond to their associated piston motors reaching the end of its opening stroke to shift the four-way valve 80 so as to effect reversal of the associated inlet valve 60 through its control valve 70.

As previously noted, the control circuit of this invention in normal operation, operates the motors 40 and 41 to open and then to close the blade 20 followed by the operation of the motors 42 and 43 to open and then close the blade 30. During the movement of the upper blade 20, the lower blade 30 is biased and held in its closed position. Similarly, during the movement of the lower blade 30, the upper blade 20 remains biased under air pressure in its closed position.

The operation of the control circuit of FIG. 3 may be explained as follows. Air pressure from the supply 62 of 50 psi, for example, comes into the spools of valves 60 and 80. Assume for example, that the lower cylinder motors 40 and 41 are closing the upper blade 20 as indicated by the direction of the arrows 96. This causes pressure to be applied to line 73 going to the cap of valve 70B and holds this valve shut and therefore prevents air on line 82 from valve 80 from going further. This condition continues until the cylinders of motors 40 and 41 bottom out and the exhaust air flow through needle valve 64A stops and line 73 loses its pressure, thus permitting valve 70B to open under the influence of its spring and allows air to go from the four-way valve 80 on line 98 to the cap of valve 60B.

During the return movement of piston motors 40 and 41, pressure has been applied to the rod side of motors 42 and 43 in the normal position of the valve 60B thus positively maintaining the lower blade 30 in its closed position. Upon the shifting of valve 60B, air pressure is now applied to the piston side causing the opening of the lower blade 30, the rate of which is controlled by the needle valve 64B.

The air being exhausted from the rod side of cylinders 42 and 43 is applied to line 94 and causes the valve 90B to remain shut until the cylinders 42 and 43 become fully extended and the exhaust flow stops. After the cylinders are thus extended and the exhaust flow has stopped, control valve 90B is allowed to open and air pressure from the source 62 goes into the upper cap of the four-way control valve 80, causing the spool to shift and apply air pressure on line 81 into the pilot valve 70A. However, the pilot cap of valve 70A has suddenly become pressurized by line 72 because the upper cylinders 42 and 43 are now retreating and there is a pressure build-up in line 72 which is holding valve 70A closed. As these cylinders become fully retracted, the flow of exhaust air stops allowing valve 70A to open. This permits air to come through line 99 to the cap of valve 60A, shifting this spool valve and applying air to the piston sides of the cylinder motors 40 and 41, which are now extending. Again, the exhaust air from the lower cylinders goes out through the controlled exhaust of the valve 60A but, in addition, it pressurizes line 93 which holds closed the valve 90A until the lower cylinders are extended. Then, valve 90A opens and admits air into the lower pilot cap of valve 80, shifting its spool to the initial position as shown in FIG. 3, and the cycle starts over again.

Shut-off switches or line valves diagrammatically shown at 100A and 100B may be applied respecitvely to the lines 99 and 98 for the purpose of opening these lines, which causes both the upper and lower valve blades to be stopped and held in their closed positions and to be maintained in these positions by reason of air pressure applied through source 62 through the normal position of valves 60A and 60B. As mentioned above, the switches or valves 100 may be remotely controlled, such as by an electric solenoid, and may be controlled selectively or in any sequence. The system may be shut down with both valve blades held closed and all piston rods fully retracted and thus protected within the cylinder housings. Further, when a start-up is desired, the switches 100 are closed and the system will begin to function normally without false or jumping starts as the lines to the valves 60 remain pressurized.

Since the control of the outward and inward movements of the pairs of piston motors is not dependent upon an actual position of the piston rods, but is only dependent upon the movement or lack of movement of these rods, a fully automatic and foolproof system is provided which thus does not depend for its operation upon any critical adjustment of the piston motors with respect to the associated valves or valve blades. In other words, the system is not dependent upon the length of stroke or position of the piston motors, but only upon the fact that they are moving the blades in one direction or the other. For this reason, the system is virtually jam-proof, for if some obstruction enters, which prevents either full closing or even the full opening of one of the blades, the cycle continues unimpeded, the jamming or stopping of the blade being taken as a signal that the blade has reached the end of its stroke thus either reversing the blade in the case of a blade moving to its open position or transferring the motion to the opposite blade in the case of the jamming of a blade before reaching its closed position. For this reason, with most obstructions, the valve is self-clearing as the continued movement of the blades will permit the obstruction to drop through or otherwise be removed without stalling the system.

A further advantage of the valve control system is that the closed blade is always forced to its closed position. Drag on the moving blade is not trasnferred as a force on the closed blade. The operation of the blades is not in any way critical to the drag induced by the seals. Also, the valve of this invention does not require torque release or torque lock-out provisions for protection of the moving parts against damage in the event one of the blades becomes jammed.

The circuit portion enclosed in the broken line 102 including the four-way valve 80 and the three-way valves 70 may be incorporated into a single integrated logic control. Also, where the capacity of the cylinders is small, the inlet control valves 60 may also be incorporated in the logic circuit. However, in larger valves, where the fluid requirements of the operating cylinders is large compared to the fluid requirements of the control circuit, it is preferred to provide cylinder control valves 60 separate from the logic circuit. The logic circuit 102 can be packaged for use with a wide variety of valve sizes or capacities.

The rate of the respective opening and closing of each of the blades 20 and 30 is separately adjustable and infinitely variable by the needle valve 64, for exact capcity. Accordingly, a simple means is provided by which the rate may be adjusted in accordance with the desired delivery rate and capacity of the air lock valve, and the type of flowable bulk material being handled.

Figure 4:
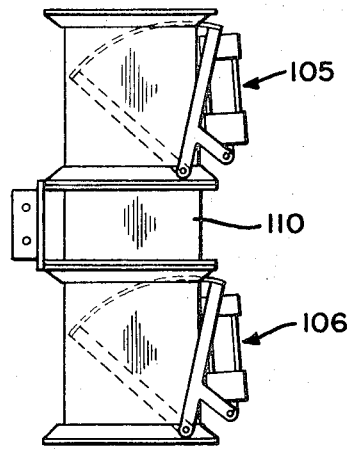
FIG. 4 shows a pair of single blade valves controlled by the control system of this invention.

Another advantage of the circuit is that it may be used with advantage, as previously noted, where two separate valves are employed, of the types shown in my U.S. Pat. Nos. 3,380,475 or 3,589,670. An example of mounting two valves 105 and 106 according to my U.S. Pat. No. 3,380,475 on a common housing or conduit section 110 is shown in FIG. 4. The blades of the upper and lower valves are controlled by the circuit of FIG. 3 in the same manner as are the blades 20 and 30 of the valve of FIGS. 1 and 2. The space between the respective valve blades determines the capacity of the valve system. The valve system may thus be tuned to the capacity of the system with which it is used, a factor which is not easily obtained with rotary feed valves.

While the invention has been described above in connection with blade control arrangements in which pairs of pistons are employed to operate each blade, it is within the scope of the invention to utilize single pistons for the control of the blades. For example, the valve as shown in my U.S. Pat. No. 3,380,475 uses a single piston for the control of the movement of the blade, and in the embodiment as shown in FIG. 4, either single or pairs of pistons may be used to effect blade movement.

Additionally, control signals may conveniently be applied to the valves 60 so that both blades can be held open simultaneously for the purpose of purging the system to which the control or metering valve is connected. Purging has not heretofore been possible where the valve blades of the air lock valve are controlled by a common mechanical movement, nor is purging possible through a conventional rotary air lock valve.

In my original lockgate valve, as shown in U.S. Pat. No. 3,556,358, only two cylinders were used, whereas four are used in the design of FIGS. 1 and 2, thus permitting two of the cylinders to rest while the other two are working. This provides for longer life of the cylinders, since the duty cycle is cut in half.

While the forms of apparatus herein described constitute preferred embodiments of the invention, it is to be understood that the invention is not limited to these precise forms of apparatus, and that changes may be made therein without departing from the scope of the invention.

What is claimed is:

1. A valve and control system therefore, for controlling the flow of dry particulate matter in a conduit in measured quantities or across a pressure differential, comprising first blade means movable between flow-blocking and flow-permitting positions in said conduit, second blade means spaced from said first blade means and movable between flow-blocking and flow-permitting positions in said conduit and defining with said first blade means a space of predetermined volume, a first two-way, fluid pressure-operated linear actuator connected to control the movement of said first blade means between its said positions, a second two-way, fluid pressure-operated linear actuator connected to control movement of said second blade means between its said positions, and control means for said linear actuators including:

a pair of flow-reversing inlet valves, one each for each of said linear actuators connected to apply fluid pressure alternately to the opposite ends of its associated said actuator to cause opening and closing movement of the associated said blade means, and inlet valve control means operable in a cycle of operation and responsive to the opening and closing movement of said first blade means for retaining said second blade means in its closed position and responsive to the corresponding opening and closing movement of said second blade means to retain said first blade means in its closed position, said valve control means being further responsive to the return of either linear actuator to its blade closed position for initiating extending movement of the linear actuator associated with the other blade means.

2. The system of claim 1 in which said inlet valves are operable in one position to cause extending movement of the associated said linear actuator and in the other position to cause retracting movement thereof, and said control valve means includes a corresponding pair of normally-open fluid pressure-operated control valves one each connected to control one of said inlet valves and having its control end responsive to pressure representing movement of the other of said actuators to prevent shifting of its associated inlet valve as long as the other actuator is either extending or retracting, a fluid pressure-operated four-way valve having opposite control ends and having its outlet ports connected respectively to the inlets of said control valves and connected to a source of pressure to apply a pressure signal to one or the other of said control valves, and further valve means connected to control said four-way valve and responsive to either of said linear actuators reaching the end of its opening stroke for shifting of said four-way valve to effect reversal of the associated inlet valve through its control valve.

3. The valve of claim 2 furtehr comprising switch means for holding at least one of said normally open valves in its open position.

4. The valve of claim 3 in which said switch means is remotely controlled.

5. A valve and control system therefor, for controlling the flow of dry particulate matter in a conduit in measured quantities or across a pressure differential, comprising a first blade movable between a closed and an open position in said conduit, a second blade spaced from said first blade and movable between a closed and an open position in said conduit and defining with said first said blade a space of predetermined volume, a first piston motor connected to control the movement of said first blade between its said positions, a second piston motor connected to control movement of said second blade between its said positions, valve control means for said linear actuators including controllable selector valves for applying fluid pressure to said piston motors for selectively applying fluid pressure thereto to effect said blade movements, and means responsive to the movement of either said blade toward an open and toward a closed position for holding the other said blade in its closed position and responsive to the cessation of either blade's movement toward its closed position for initiating the opening movement of the other of said blades.

6. A valve and control system therefore, for controlling the flow of particulate matter in a conduit in predetermined quantities or across a pressure differential, comprising a first curved blade movable in said conduit between flow-blocking and flow-permitting positions, a second curved blade spaced from said first blade and movable in said conduit between flow-blocking and flow-permitting positions and defining with said first blade a space of predetermined volume, a first pair of two-way piston motors connected to control the movement of said first blade between its said positions, a second pair of two-way piston motors connected to control movement of said second blade between its said positions, and motor control means including:

a first and second flow-reversing inlet valves, one each for each of said motor pairs connected to apply fluid pressure alternately to the opposite ends of its piston motors to cause opening and closing movement of the associated said blade, and inlet valve control means operable in a cycle of operation and responsive to the opening and closing movements of said first blade for applying fluid pressure through said second valve for retaining said second blade in its closed position, and responsive to the corresponding opening and closing movements of said second blade to apply fluid pressure through said first valve for retaining said first blade in its closed position, said valve control means being further responsive to the cessation of movement of either of said blades toward its said closed position for initiating extending movement of the piston motors associated with other blade.

7. A symmetrical-air lock gate valve for controlling the flow of particulate flowable material from a first region into a second region, comprising:

an elongated valve housing which is rectangular in section and formed with an inlet adapted to open into said first region and an outlet adapted to open into said second region, said housing defining a section of flow conduit extending between said inlet and said outlet, said conduit section being defined by a rear wall, a front wall and a pair of side walls, a pair of essentially identical curved flow control blades and support arms including a first blade extending through the rear wall of the housing and proportioned to extend across the conduit section adjacent said inlet in a flow blocking position, a first pair of blade supporting arms with the individual arms thereof being positioned on opposite sides of said housing adjacent said outlet, said first pair of arms supporting said first blade with the concave side thereof facing said outlet and providing for arcuate movement thereof through said conduit from said flow blocking position to a retracted position, a second curved blade also extending through said rear wall and proportioned to extend across said conduit section adjacent said outlet in a flow blocking position, a second pair of blade supporting arms essentially identical with said first pair of arms, said second pair of arms also being positioned on opposite sides of said housing in non-interfering relation to said first pair of arms and being pivotally mounted on said housing adjacent said inlet, said second pair of arms supporting said second blade with the concave side thereof facing said inlet and providing for arcuate movement between a flow blocking position and a retracted position for the discharge through said outlet of material within said conduit section, four essentially identical piston motors arranged in pairs of motors on either side of said housing corresponding to said arms, each of said motors having one end pivotally connected to one of said arms, and support means on said front wall positioned symmetrically between said inlet and outlet and common to said pairs of motors for pivotally supporting the opposite ends thereof.

* * * * *